Figures 1, 2, 3:
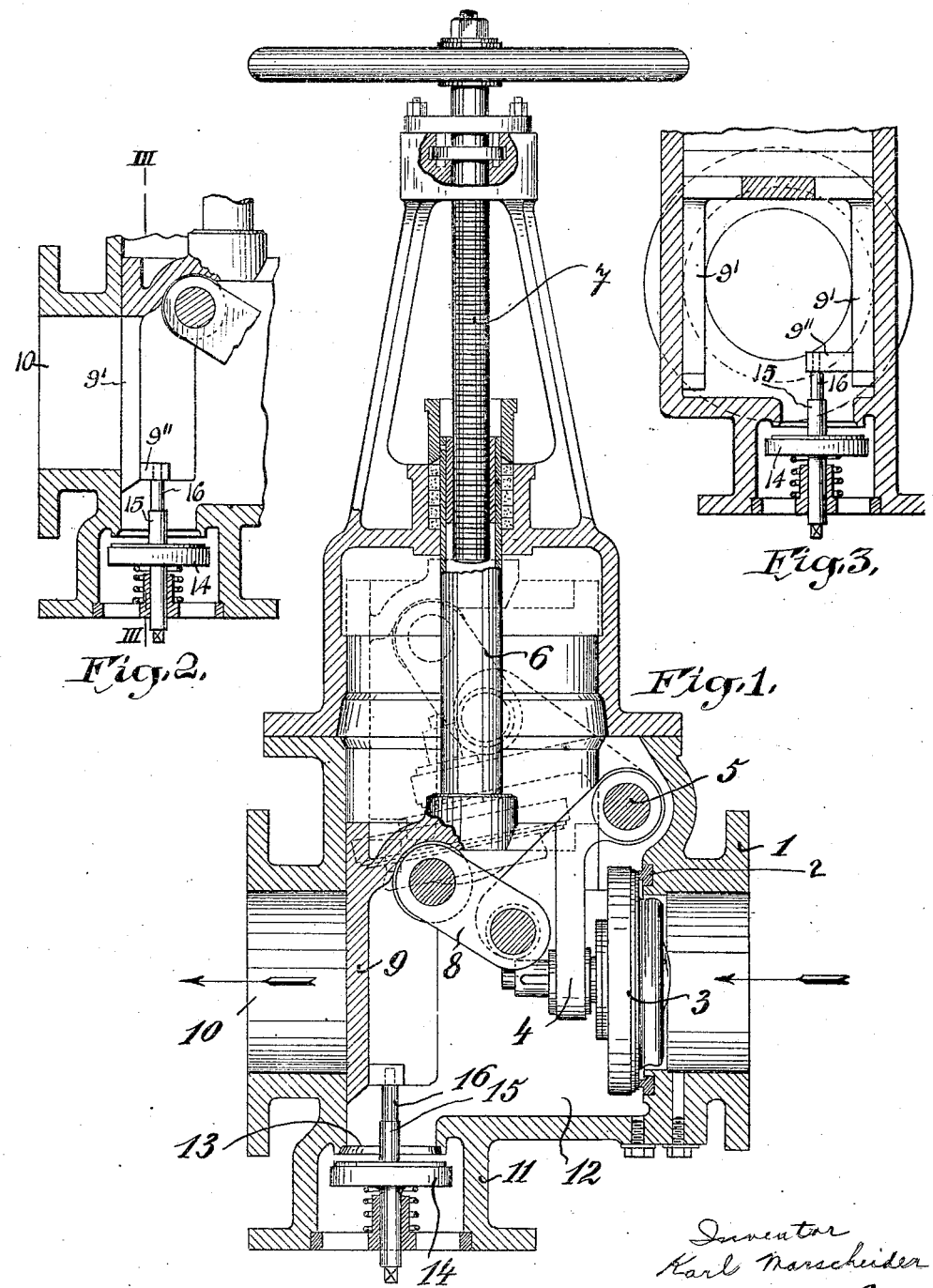

May 13, 1924.

K. MARSCHEIDER

STOP VALVE FOR GASEOUS FLUIDS

Filed Sept. 2, 1921

1,493,819

Inventor
Karl Marscheider
By Knight Bro
Attys.

Patented May 13, 1924.

1,493,819

UNITED STATES PATENT OFFICE.

KARL MARSCHEIDER, OF BERLIN-TEGEL, GERMANY.

STOP VALVE FOR GASEOUS FLUIDS.

Application filed September 2, 1921. Serial No. 498,005.

(GRANTED UNDER THE PROVISIONS OF THE ACT OF MARCH 3, 1921, 41 STAT. L., 1313.)

*To all whom it may concern:*

Be it known that I, KARL MARSCHEIDER, a subject of the German Republic, residing at Berlin-Tegel, Germany, 33 Brunowstrasse, have invented certain new and useful Improvements in Stop Valves for Gaseous Fluids (for which I have filed applications (Gebrauchsmuster) in Germany on April 19, 1920, No. 756,830, and on October 26, 1920, No. 760,357), of which the following is a specification.

My invention relates to stop valves for gaseous fluids and in particular, to valves of this kind which are to be used in connection with gas furnaces. Such valves should be absolutely tight so that no gas can enter during an inspection of the boiler, which not only endangers the health of the men working in the boiler, but also may cause the formation of explosive mixtures under certain conditions, by which the plant may be damaged and even destroyed. It is impossible in practice to provide a valve which is absolutely tight and will remain so for a long time. One object of the invention is, therefore, to provide means which in case a valve should leak will prevent trouble. This is principally effected by arranging a second valve at the rear of the principal valve which opens into atmosphere and is lifted by positive action upon closing the principal valve. In this manner, air is removed from the pipe at the rear of the valve and any gases which may escape through the valve are discharged without doing harm. The feature of this device is the positive action of the air discharge, that is the fact that the pipe is automatically and positively opened upon closing the principal valves. The second valve may be under the action of a spring so that it will act as a safety valve when the principal valve is open. If the principal valve is constructed as a double valve, that is, if with the disc of the valve a slide is connected which moves downwards upon closing the valve, and closes the pipe at another point, the second valve may be operated by the slide opening it before the slide attains its closing position. In this case, the hollow space between the two closing parts of the valve is connected with atmosphere, so that gas which enters this space when the valve is leaking, gets into the open air and not into the pipe.

In the drawing, Fig. 1 illustrates a constructional example of the subject-matter of the invention in vertical section;

Fig. 2 illustrates in vertical section (partly broken away) a modified form of the invention; and Fig. 3 is a vertical section on the line III—III of Fig. 2.

The valve casing is connected with the gas pipe by a flanged socket 1 comprising a valve seat 2 on which fits a valve disc 3. The valve disc 3 is connected with a lever 4 by means of which it can be turned about a pin 5 through an angle of about 90 degrees, as illustrated in dotted lines, in order to allow a free passage of the gas. The valve disc is controlled by a sleeve 6 which is adapted to be moved up and down by a screw spindle 7. The lever is connected to this sleeve 6 by means of a link 8. Secured to the sleeve 6 is a slide 9 which is adapted to close the discharge socket 10 of the valve casing and is raised when sleeve 6 is raised. (See position illustrated in dotted lines.)

The space 12 between the valve disc 3 and the slide 9 is connected with the atmosphere by a flanged socket 11 comprising a valve seat 13 on which fits a spring loaded valve disc 14. Provided on disc 14 is a pin 15 which is adapted to be engaged by a pin 16 on slide 9. By these means, the valve 14 is opened by slide 9 before the slide has reached its closing position. In the drawing, the position of parts is shown when the principal valve is closed, in which position the second valve 14 is automatically and positively opened.

The operation of the valve is as follows:

When the valve is open, its parts are in the position illustrated in dotted lines and the full area is open for the gas to pass through the casing in the direction of the arrows. The second valve 14 is now on its seat 13 and operates as a safety valve under the action of its spring which may be adjustable. In this manner, the pressure, if it should be too high, will be balanced with atmospheric pressure. When the supply of gas is to be interrupted, the sleeve 6 is moved downwards by means of spindle 7 so that the valve disc will turn through an angle of 90 degrees in a downward direction and be forced on its seat 2. At the same time, the slide 9 moves in front of the discharge opening 10 so as to form a second closure of the pipe.

A short time before slide 9 is in its closing position as illustrated in full lines, the pin 16 strikes the pin 15 and opens the second valve 14, which is positively held open so long as the principal valve remains closed. In case the valve disc 3 is not tight and gas escapes into the chamber 12 between the disc 3 and the slide 9, it will escape through the socket 11. By this arrangement gas is absolutely prevented from getting into the pipe to the rear of the valve and entering the place of consumption, say, a boiler furnace. The positive connection of the second valve 14 and the principal valve absolutely prevents damage to the plant and danger for the men.

It is to be understood that under certain circumstances it will be sufficient if the principal valve has but one closing element which is then operatively connected with the second valve in such a manner that the second valve is opened when the principal valve is closed. Such an embodiment is illustrated in Figs. 2 and 3 in which the slide 9 is shown broken away so as to uncover the end of the pipe 10, the slide being replaced by two arms 9′ which serve as an abutment against which the link 8 works in forcing the valve 3 against its seat. A lug 9″ is provided on one of the arms and this lug carries the pin 16 which cooperates with the projection 15 of the valve 14 in the same manner heretofore described with reference to Fig. 1.

What I claim is:

1. A stop valve for gaseous fluids comprising in combination, a flap valve having a fixed pivotal point, a slide valve, means for reciprocating said slide valve, and a toggle link between said slide valve and said flap valve, whereby said valves are simultaneously controlled.

2. A stop valve for gaseous fluids comprising in combination, a valve, a slide, means for reciprocating said slide, a toggle link between said slide and said valve, whereby said valve is simultaneously controlled with said slide, and an auxiliary valve to the atmosphere in the rear of said valve, said slide during its closing movement engaging and opening said auxiliary valve.

3. A stop valve for gaseous fluids comprising a double closure consisting of a valve disc and a slide, an auxiliary valve opening to atmosphere, a pin carried by said slide and a lug carried by said auxiliary valve and projecting in the path of said pin, whereby the auxiliary valve is opened a short time before the slide reaches its closed position.

4. A stop valve according to claim 3 in which the auxiliary valve communicates with the space between the valve disc and slide.

The foregoing specification signed at Berlin Germany this 9th day of August, 1921.

KARL MARSCHEIDER.

In presence of—
ANTON LIPPERT,
ARTHUR MAURER.